Patented May 27, 1941

2,243,470

UNITED STATES PATENT OFFICE

2,243,470

PRODUCTION OF HIGH MOLECULAR WEIGHT POLYMERS FROM ISO-OLEFINS AND HALOGENATED DERIVATIVES OF THE POLYMERS

Arnold J. Morway, Clark Township, Union County, and Floyd L. Miller, Roselle Park, N. J., assignors to Standard Oil Development Company, a corporation of Delaware No Drawing. Application April 21, 1939, Serial No. 269,096

7 Claims. (Cl. 260—94)

This invention relates to high molecular weight halogenated organic compounds and methods of preparing same. More particularly, it relates to the halogenation of high molecular weight hydrocarbon polymers such as those produced by the polymerization of isobutylene at low temperature, generally below 0° C. and preferably as low as −10°, −20° C., or even −80° C., in the presence of boron fluoride or other halide polymerizing catalyst effective at such low temperature.

It has been discovered that such polymers, which may range from 1,000 or so up to 15,000, 20,000 or even 250,000 or more in molecular weight (determined by the viscosity method described in Staudinger's book, "Die Hockmolekularen Organischem Verbindungen," H. Staudinger Berlin 1932 Verlag Von Julius Stringer, page 56), are very stable and relatively inert chemical compounds, being substantially completely saturated with respect to hydrogen and having a very low iodine number, e. g. about 7 or less. Generally, the higher the molecular weight the more chemically inert are these polymers. For instance, they are substantially not affected by sulfuric acid and they are very resistant to oxidation, sulfurization, and many other chemical treatments. They differ from rubber which is quite unsaturated in that they cannot be vulcanized by sulfur while rubber can, and in that they are soluble in all proportions in petroleum hydrocarbons, such as naphtha, kerosene and lubricating oils, causing an increase in the true viscosity and viscosity index thereof, while rubber forms a gel (merely swells) in those liquids.

Other similar materials which may be treated according to this invention include any similar substantially saturated high molecular weight polymers which may be considered to have a chemical structure corresponding to that of a very long chain of carbon atoms containing occasional side chains of alkyl groups, such as methyl, ethyl, etc. Besides isobutylene, other iso-olefins, such as iso-amylene, may be polymerized at low temperature, to produce high molecular weight polymers for use as raw material for this invention. Although the above type of material is preferred, other materials believed to have a substantially similar chemical structure but formed in other ways may be used in some instances, for example, "hydro-rubber" (which is produced by destructive hydrogenation of rubber and is entirely different from the parent substance in its properties and behavior).

According to the present invention, high molecular weight halogenated compounds are prepared by contacting a halogen with a solution of a high molecular weight hydrocarbon of the structure described. The solvent to be used may be any one which is non-reactive with the halogen being used or which, if reactive therewith, will not cause any harmful effect on the high molecular weight product. Carbon tetrachloride has been found very suitable. Other solvents, such as sulfur halides, etc., may be used. The solvents must be sufficiently fluid that a solution of the high molecular weight hydrocarbon therein will not be too viscous for treatment with the halogen under the conditions of treatment. The halogen to be used may be any one of the four, i. e. fluorine, chlorine, bromine or iodine, although chlorine is the cheapest and most practical.

The halogenation may be carried out at room temperature or elevated temperature, such as up to 50° C. or 100° C., but should not be too high inasmuch as halogenation at an excessively high temperature will cause excessive breakdown of the molecular weight of the product. The halogenation may be carried out at atmospheric pressure or considerably higher pressures, such as 5 to 50 or 100 atmospheres or more, especially when carrying out the reaction at low temperature. Iodine may be used as a catalyst. If desired, the halogenation may be carried out in the presence of peroxides, e. g. benzoyl peroxide, to direct the halogen atoms preferentially to the alpha (end) carbon atoms in hydrocarbon molecules. The percent of halogen incorporateed depends upon the duration of the treatment. Generally, it is desirable to incorporate from 10% to 20% of halogen, although as little as 1% and as much as 50% may be incorporated if desired.

Various methods may be used for treating the high molecular weight hydrocarbon with the halogen. For example, chlorine may be bubbled through a carbon tetrachloride solution of the high molecular weight polymer or chlorine may be subjected to a countercurrent spray of a solution of the polymer. Another alternative is to carry out the halogenation treatment in the presence of bases, e. g. calcium or magnesium oxides or carbonates, sodium carbonate or bicarbonate, etc., or over water containing an insoluble carbonate, such as calcium carbonate or magnesium carbonate, for the purpose of absorbing hydrogen chloride liberated by the reaction.

If desired, instead of first preparing the polymer in relatively pure form and then dissolving it in a suitable solvent, such as carbon tetrachloride, and passing chlorine through this solution, the original polymerization of isobutylene, for example, may be carried out in the presence of carbon tetrachloride or other solvent which will be suitable for the halogenation and then as soon as the polymerization process is completed the solution of the high molecular weight polymer may be treated immediately with a desired halogen, thereby avoiding the removal of the solvent used during the polymerization step and subsequent redissolving of the polymer in a solvent for the halogenation step.

If desired, after the halogenation has been completed, the solution may be blown with air or inert gas, such as nitrogen or hydrogen, at a slightly elevated temperature, but preferably not above 100° C., in order to remove hydrogen chloride. Any traces still remaining may be removed by further blowing the liquid with ammonia, or other volatile amine, alone or mixed with air or inert gas, preferably at room temperature or perhaps up to 40 or 50° C.

As an alternative, the product may be washed one of more times with dilute alkali, such as caustic soda, in order to remove any free hydrogen chloride remaining as a result of the halogen treatment. It may also, under some circumstances, be desirable to heat the chlorinated polymer at a low temperature with a basic material, such as alcoholic potash, aqueous calcium hydroxide, sodium carbonate solution, sodium bicarbonate, etc., to remove one or possibly more halogen atoms and thereby produce a further stabilized product. A difficultly volatile basic compound, preferably an aromatic amine such as monoethyl aniline or methyl naphthyl amine, may be added as a stabilizer (in proportions of 0.1 to 1% or so) to the finished halogenated hydrocarbon.

The products prepared according to the present invention are high molecular weight halogenated hydrocarbons and their physical properties depend upon the nature of the original material treated and the duration and type of treatment. These products may be used for a wide variety of purposes; for instance, they may be condensed with aromatic hydrocarbons in the presence of aluminum chloride, boron fluoride or other condensing agents, to produce materials suitable as lubricants or blending agents in lubricants, such as pour depressors, or they may be used for any other type of condensation reactions in which halogenated aliphatic hydrocarbons are used as one of the reactants.

Halogenated hydrocarbon polymers, prepared according to the invention, may be used in conjunction with suitable soft resins and pigments, with or without linseed oil, volatile solvents, etc., in the compounding of paints which are resistant to chemical and mechanical influences and also non-inflammable, or they may be compounded with various resins alone, such as those prepared from petroleum hydrocarbons by various known methods, in order to improve the properties of such resins.

Another field in which these high molecular weight halogenated polymers are useful is the preservation of wood by impregnation with wax. Ordinary wax-impregnated wood is subject to spotting by water but if a small amount, such as ½% to 10%, of, for instance, chlorinated polymerized isobutylene, containing 5 to 10% chlorine, is incorporated with the wax, the spotting of the impregnated wood is greatly reduced, if not completely prevented. The halogenated polymers of the invention are useful as fire-resistant impregnating agents generally, for impregnating various types of porous or fibrous materials, such as wood, cloth, paper and various composition materials used for building purposes, etc.

These halogenated products, which can be prepared according to this invention, may frequently serve to advantage as solvents or plasticizers. For delustering artificial silk, these high molecular weight halogenated polymers may be mixed with an inert organic material of an oily or waxy nature, such as petroleum oil, petroleum jelly and paraffin wax, and the mixture added to solutions of artificial silk to be spun.

Many other uses will no doubt occur to those skilled in the art and it is an object of the present invention to claim broadly these high molecular weight halogenated products prepared from substantially saturated organic compounds having a structure represented by a long straight chain of carbon atoms with a plurality of alkyl side chains and containing a substantial proportion of halogen atoms incorporated according to this invention regardless of the purpose for which they are to be used.

The invention will be illustrated from the following examples:

Example 1

Chlorine gas is diffused at room temperature in ordinary diffused light, through a solution of carbon tetrachloride containing, dissolved therein, about 20% of a hydrocarbon polymer having a molecular weight of about 2,000 and prepared by polymerizing isobutylene at a temperature of −20° C. with boron fluoride as catalyst. When about 20% of chlorine has been combined chemically with the polymer the chlorination is stopped and the product is washed with water and the carbon tetrachloride removed by distillation.

The product of this experiment differs from chlorinated rubber in that (1) rubber containing small amounts of chlorine is unstable, while the present product is relatively stable, (2) no solid chlorinated products were obtained as in the chlorination of rubber, and (3) the present product is miscible with paraffin wax while chlorinated rubber is not.

The chlorinated polymer, for example, may also be used in compounding high viscosity index extreme pressure lubricants either alone or in conjunction with sulfur or sulfur compounds or other materials known to the art in preparing extreme pressure lubricants.

The saturated high molecular weight polymers may also be mixed with wax, resins, mineral and vegetable oils, chloraromatics, esters, and the like, prior to or after halogenation. When blended in mineral oils, the chlorinated polymer may be used in conjunction with oxidation inhibiting amines, oiliness agents, thickeners, sludge dispersers, pour inhibitors, soaps, bright stocks, white oils, etc.

Example 2

When the isobutylene polymer is of a low molecular weight (around 3,000) the direct chlorination is effected by passing chlorine gas through the polymer in the presence of very small amounts of iodine to catalyze the reaction. In this example no solvent is present and the resulting product requires only a slight carbonate washing to remove any of the remaining HCl.

Example 3

Chlorine gas is passed under pressure through vents in the bottom of a tower packed with broken porcelain or spiral packing; when the tower has become saturated with the chlorine gas a solution of isobutylene polymer in carbon tetrachloride is sprayed in at the top of the tower passing down through the chlorine gas and being removed at the bottom of the tower and pumped back to the top of the same tower or other similar towers and the contact repeated until the chlorine content has reached the required amount.

The gaseous mixture removed at the top is scrubbed free of HCl by passing through solid caustic soda and again passed in at the bottom of the tower. The carbon tetrachloride solution of chlorinated isobutylene polymer is washed free of HCl by a slight carbonate washing and the carbon tetrachloride removed by distillation.

Example 4

150 grams of polymerized isobutylene (12,000 molecular weight) were dissolved in 850 grams of carbon tetrachloride by heating (120–140° F.) and stirring for 1½ hours. After the polymerized isobutylene was completely dissolved, the solution was transferred to a separatory flask and 0.5 grams of iodine added. Chlorine gas was passed through the solution at a slow rate at room temperature (75–80° F.) by means of a small alundum thimble attached to a glass tube and suspended close to the stopcock end of the separatory flask. Chlorine was passed through the solution for 5½ hours and then discontinued over night (about 16 hours). The following morning the chlorine was again passed through the solution for eight hours, and then again shut off. The chlorine saturated material was allowed to stand over the weekend (60 hours).

A small sample (200 grams) of the carbon tetrachloride solution of the chlorinated product was placed in a filter flask, and the carbon tetrachloride distilled off at 200–210° F. (water bath) under laboratory vacuum pressure, after which carbon dioxide was blown through.

The product was a heavy viscous material, similar to the original polymerized isobutylene and having a slight pink color due to iodine present. The product shown by analysis to contain 24% chlorine was found to be completely soluble in petroleum ether and mineral lubricating oil.

In the removal of traces of carbon tetrachloride from the washed solution of chlorinated isobutylene polymer in carbon tetrachloride, almost the total amount of solvent is removed by mere distillation, either atmospheric or under reduced pressure, the remaining traces of solvent being removed by dissolving the practically solvent-free chlorinated product in close cut naphtha with a boiling range close to the boiling point of carbon tetrachloride (75° C.) and redistilling.

Many of the above steps may be combined.

The present application is a continuation-in-part of application Serial No. 170,120 filed October 20, 1937, which is a continuation-in-part of application Serial No. 749,072 filed October 19, 1934; the present application is directed to the process of polymerizing isobutylene directly in carbon tetrachloride with or without subsequent halogenation. A halogen-containing solvent such as carbon tetrachloride has a number of advantages in the polymerization step; for instance, it serves as a good medium for dispersing or suspending the catalyst, such as boron fluoride, aluminum chloride, titanium tetrachloride, and other volatilizable Friedel-Craft halide polymerization catalysts; it is also a good solvent medium for the olefin or other unsaturated hydrocarbon to be polymerized and a good solvent medium for the resultant polymer; although the polymer's solubility varies in different halogen-containing solvents; it serves as a good reaction medium for effecting the polymerization itself, i. e. the actual chemical reaction involved in the joining together of a large number of monomeric molecules to form a high molecular weight polymer; and finally, the halogen-containing solvent is also a good medium and a necessary medium for carrying out the halogenation step if one is used.

Instead of using carbon tetrachloride, one may use other organic halide solvents, preferably aliphatic ones such as chloroform, methylene chloride, methyl chloride, ethyl chloride, ethylene dichloride, tetrachlorethane, difluoro methane, monochlor monofluor methane, as well as propyl-, butyl-, and higher alkyl halides. It is preferred to use chlorine- and fluorine derivatives of aliphatic hydrocarbons having less than 6 carbon atoms and preferably even less than 3 carbon atoms, especially when the polymerization is to be carried out at very low temperatures such as below −50° C. Although aliphatic chlorides are preferred, it is possible under some circumstances to use aryl halides such as mono- or dichlorbenzene, or mixed aralkyl halides such as benzyl chloride, or even other halogen-containing compounds such as those of bromine or iodine provided they are stable and inert under the conditions of polymerization. One may also use mixtures of various organic halide solvents either as made by chlorinating mixed hydrocarbon fractions, e. g. chlorinated butane fraction or chlorinated refined gasoline or mixtures of individual pure halogen-containing compounds.

In many cases, particularly where no subsequent halogenation step is to be used, it is preferred to mix with the halogen-containing solvent an inert hydrocarbon diluent, for instance, aliphatic hydrocarbons such as petroleum ether, liquefied butane, propane, ethane, methane or ethylene (under non-polymerizing conditions) or aromatic hydrocarbons such as benzene, toluene, etc., or various mixed hydrocarbon liquids.

Even in cases where subsequent halogenation is to be used an easily volatilized hydrocarbon diluent may be used, such as liquid ethylene, propane, methane, etc., which can be readily vaporized out from the solution of polymer in the halogenated solvent merely by releasing the pressure or allowing the temperature to rise. The liquefied gaseous hydrocarbons are particularly suitable for admixture with the halogenated solvent because they serve as internal refrigerants, being caused to boil if the temperature of the reaction liquid becomes greater than their boiling point. Halogenated hydrocarbons, such as methyl fluoride, may similarly be used as internal refrigerants.

Instead of isobutylene, other olefins may be used, preferably iso-olefins, e. g., 2-methyl butene-1, which polymerize to extremely viscous liquid or plastic solid polymers having a molecular weight above about 1,000.

The conditions of polymerization such as temperature, pressure, type of catalyst, concentration of materials, diluents, etc., must of course be varied to some extent according to the types of materials being polymerized.

Fractional separation of the high molecular weight polymers may be effected by solvent precipitation, or other suitable means. For example, isobutylene may be polymerized in a mixture of ethylene dichloride and ethylene at a temperature of about −100° C.; after the polymerization is complete and after any unvaporized ethylene is recovered from the chlorinated solvent solution of the polymer and the residual catalyst is removed, a suitable precipitant such as methyl, ethyl or isopropyl alcohol, or acetone or some other suitable oxygen-containing liquid, is added to and stirred into the ethylene dichloride solution of polyisobutylene, adding sufficient of the precipitant to effect the required type of separation. Usually when just a small amount of the precipitant is added, a relatively small amount of polymer is precipitated out of solution but this polymer has a very much higher molecular weight than would be the case if a larger amount of precipitant were used. On the other hand, the larger the amount of precipitant added, the larger is the yield of the polymer precipitated out of solution. Usually the amount of alcohol or other precipitant to be added should be an amount equal to from 5% to 50% by volume of the polymer solution. If desired, some aliphatic or aromatic or mixed alkyl aromatic hydrocarbon liquid may be present during this solvent precipitation.

The temperature to be used for the polymerization of olefins in a halogenated solvent depends upon a number of factors, for example, the higher the molecular weight desired in the finished polymer the lower should be the temperature and the purer the olefin, catalyst and solvent solution used. The temperature should preferably be below −10° C. and better still below −50° C., but in any case should be below the decomposition temperature of the halogen-containing solvent.

Some of the many advantages of this invention are the following:

1. The halogenated solvent is a good medium in which to suspend the catalyst, since it is an especially good solvent for many halide catalysts of the Friedel-Crafts type and in any case serves as a good dispersing agent for catalysts which may not be completely soluble.

2. The halogen-containing solvent is a good medium for dissolving the olefins to be polymerized as well as for the resulting polymer products, although the solubility of the latter depends to a certain extent upon the type of halogenated solvent used.

3. The halogen-containing solvent is a good medium in which to carry out the polymerization because apparently it has good solvent properties on all of the materials concerned in the reaction, namely, the olefins to be polymerized, the catalyst, as well as any hydrocarbon or other type of diluents or internal refrigerants present; the net result is a faster and more efficient polymerization reaction with a resultant production of a polymer having generally a higher average molecular weight and a tougher or more rubbery texture, also being substantially freer from the cold flow tendencies frequently observed in other polymerization products.

4. One of the most important advantages of this invention is that the halogenated solvent may, after first being used for the polymerization of the saturated hydrocarbon and removal or killing of any residual catalyst, be used directly for a subsequent halogenation treatment; this effects an important economy and efficiency because high molecular weight viscous liquid or plastic solid rubber-like polymers generally require a substantial amount of time and physical kneading in order to dissolve them in any type of solvent and the present invention eliminates necessity of any such dissolving step. These and other advantages of the invention will be further apparent from a consideration of the following examples which are given for the sake of illustration only and not for limitation.

Example 1

1 part of liquid isobutylene and 2 parts of carbon tetrachloride by volume were mixed together and cooled down to −78° C. by addition of powdered carbon dioxide. Boron fluoride gas was bubbled into the mixture. Upon polymerization of the isobutylene the whole liquid mass froze up (due to solidification of the carbon tetrachloride), but the mixture which apparently was a solid solution of high molecular weight polyisobutylene in carbon tetrachloride melted readily (and dissolved) immediately upon warming up to room temperature. The polyisobutylene had a molecular weight of about 20,000, the yield being about 50 to 60%. This proves to be a much easier and quicker way of making a polyisobutylene solution in carbon tetrachloride than to first produce the polyisobutylene by itself and then dissolve it in carbon tetrachloride.

Example 2

About 1 part by weight of isobutylene and 3 parts by weight of ethylene dichloride were mixed and cooled down to −78° C. using an excess of dry ice (solidified carbon dioxide) and boron fluoride was bubbled through the mixture. The resulting polyisobutylene had a tetralin number of about 53.0 which corresponds approximately to a molecular weight of about 52,000 as determined by the Staudinger viscosity method referred to previously.

For the sake of comparison, the above experiment was repeated except that liquid propane was used instead of ethylene dichloride. The resulting polymer only had a tetralin number of 33.1 which corresponds to a molecular weight of about 42,000.

These two tests in Example 2 show that the ethylene dichloride is a much better solvent for the polymerization of isobutylene than is propane. It was also noticed that the polymer produced in ethylene dichloride was substantially tougher and more rubber-like than the polymer produced in propane; for instance, it can be pulled out into flat films.

Example 3

Another suitable solvent for carrying out the polymerization of isobutylene is a mixture of 1 volume of liquid isobutylene, 2 volumes of liquid ethylene and 1 volume of ethyl chloride.

Example 4

The process described in the first part of Example 2 is repeated and when the polymerization has been completed the solution is allowed to warm up to room temperature in order to liberate most of the boron fluoride dissolved and, if desired, is either heated or blown with an inert gas, such as nitrogen or carbon dioxide, in order to liberate any residual boron fluoride, or the solution of polyisobutylene in ethylene dichloride may be washed with water, caustic soda or alcohol in order to kill any residual $BF_3$. Then the solution, preferably at a temperature substantially below 0° C., is exposed to a strong light, such as direct sunlight or ultra violet light, and chlorine is bubbled through the solution until the polyisobutylene has been given a chlorine content of about 35% to 40%. After driving out any residual free chlorine the resulting chlorinated polyisobutylene is separated from the solvent either by precipitation and/or by evaporation of the solvent.

It is not intended that the invention be limited to any of the specific examples given nor to any theories of the operation of the invention but in the appended claims it is intended to claim all inherent novelty in the invention as broadly as the prior art permits.

We claim:

1. The process which comprises polymerizing isobutylene in the presence of carbon tetrachloride with boron fluoride as catalyst, at a temperature below −10° C.

2. In the process of producing hydrocarbon polymers having molecular weights above 1,000 from an iso-olefin by treatment with a volatilizable Friedel-Craft halide catalyst at a temperature below −10° C., the improvement which comprises reacting the iso-olefin by treatment with said catalyst and in the presence of a saturated aliphatic halide solvent having less than 3 carbon atoms per molecule whereby the solution of the high molecular weight polymer in the solvent is obtained.

3. The process as described in claim 2, in which said aliphatic halide contains at least 2 halogen atoms per molecule.

4. A process as described in claim 2, in which the iso-olefin is reacted in the presence of an inert normally gaseous refrigerant.

5. A process as described in claim 2, in which the iso-olefin is reacted in the presence of solid carbon dioxide.

6. The process which comprises forming polymers having molecular weights above 1,000 from an iso-olefin by treatment with a volatilizable Friedel-Craft halide catalyst at a temperature below −10° C. in the presence of a solvent comprising essentially a saturated aliphatic halide containing less than 3 carbon atoms per molecule and at least 2 halogen atoms per molecule, and thereafter treating a resultant polymer solution with a free halogen to effect halogenation of the polymer in the presence of said aliphatic halide.

7. In a process for producing hydrocarbon polymers of iso-olefins having molecular weights above 1,000 by means of volatilizable Friedel-Craft halide catalyst at temperatures below −10° C., the improvement which comprises reacting the iso-olefin in the presence of a saturated aliphatic halide solvent having less than six carbon atoms in the molecule, whereby a solution of the high molecular weight polymer in the solvent is obtained.

ARNOLD J. MORWAY.
FLOYD L. MILLER.